United States Patent Office 3,081,146
Patented Mar. 12, 1963

3,081,146
INHIBITION OF CORROSION OF METAL SURFACES IN CONTACT WITH CORROSIVE AQUEOUS MEDIA
David B. Boies, Chicago, Joan Crowther, Evanston, and Walter J. Ryzner, Chicago, Ill., assignors to Nalco Chemical Company, a corporation of Delaware
No Drawing. Filed Feb. 27, 1959, Ser. No. 795,896
13 Claims. (Cl. 21—2.7)

This invention, in general, relates to new and improved compositions for the treatment of metal surfaces to minimize corrosion thereof by corrosive aqueous media and also to new and improved methods for inhibiting corrosion of metal surfaces by corrosive aqueous media.

The invention is particularly concerned with inhibition or prevention of underwater corrosion in cooling systems where water is moving in heat exchange relationship with hot metal surfaces, viz., through condensers, engine jackets, heat exchangers, spray or cooling towers and distribution systems associated therewith. The invention is especially valuable in inhibiting corrosion of ferrous metals including iron and steel, and also in inhibiting corrosion of nonferrous metals such as Admiralty metal, the latter being a yellow brass containing about 1% tin. The major corrosive ingredients of the aqueous cooling systems are primarily dissolved oxygen and inorganic salts such as the carbonate, bicarbonate, chloride and/or sulfate salts of calcium, magnesium and/or sodium. The pH of these systems usually is in the range of 6–8. Corrosion inhibiting treatments of metal surfaces in contact with water by the addition of certain types of phosphates, chromates, combined mixtures of chromates and phosphates, or organic type compounds have been used heretofore with some success in the reduction of corrosion rate of ferrous metals and Admiralty brass in contact with water.

This invention is concerned primarily with improvement of these types of treatments by an in-system pretreatment or a soaking pretreatment of metal parts in contact with or to be used in contact with corrosive aqueous media with a relatively concentrated aqueous solution of one or more alkali metal molecularly dehydrated phosphates. In some instances, the treatment with the molecularly dehydrated phosphate is made in conjunction with a simultaneous treatment of the metal surfaces with an organic wetting agent having a detergent action toward grease, oil and/or loose rust scale. The initial treatment with the molecularly dehydrated phosphates on a relatively concentrated basis is followed up by maintaining a concentration of molecularly dehydrated phosphate, chromate, or other corrosion inhibitor in the system at a concentration of much lower order than that employed in the initial treatment. In some cases, the system may be maintained, at effectively controlled corrosion rates, at concentrations of the molecularly dehydrated phosphates or chromates which would not effectively control the corrosion of the metal if the initial treatment at the higher concentration had not been used.

In a broad sense, this invention is concerned with the plating or coating of ferrous metals, Admiralty metal and the like with a highly effective corrosion inhibiting film of molecularly dehydrated phosphates bonded directly to the metal surfaces by a treatment for a relatively short period of time with an aqueous solution containing in the order of 60–250 p.p.m., as $PO_4$, of one or more molecularly dehydrated phosphates in the case of in-system treatments or a concentration in the order of 100 to 20,000 p.p.m., as $PO_4$, in soaking pretreatments. The follow-up treatment is essentially a treatment to maintin the corrosion-inhibiting coating on the metal surfaces. This follow-up treatment may be one with a molecularly dehydrated phosphate or mixtures of said phosphates, either the same or different from the initial treatment, or it may be a treatment with a corrosion-inhibiting composition other than phosphate or a mixture of phosphate with other corrosion-inhibiting compositions, for example, chromates. In some cases, the follow-up treatment is most effective with a molecularly dehydrated phosphate, in other cases it is most effective with chromate and in other instances it may be effective with combined phosphate and chromate treatments.

It is important that the metal surfaces treated with the initial high concentration of molecularly dehydrated phosphates be as clean as possible in order to effect a tight, corrosion-inhibiting film of the molecularly dehydrated phosphates on the metal. In instances where the metal surfaces such as tubes or the like have oil, grease or rust thereon the initial treatment is carried out in the presence of an organic wetting agent having detergent action toward the rust scale, oil or grease. The scouring of the surfaces most conveniently is carried out simultaneously with the laying of the molecularly dehydrated phosphate film—the phosphate and the wetting agent being present in the initial treatment fluid.

One of the objects of this invention is to provide new and improved methods for the treatment of metal surfaces to minimize corrosion thereof when said surfaces are in contact with aqueous media.

Another object of the invention is to provide a two-stage process in the treatment of metal surfaces in contact with water to minimize corrosion of said metal surfaces by first forming a corrosion inhibiting, protective film of one or more molecularly dehydrated phosphates followed by the maintenance of the corrosion-inhibiting film by a follow-up treatment with a corrosion-inhibiting compound at dosages maintaining the protective film over relatively long periods such as at least one month, preferably several months.

A still further object of the invention is to provide new and useful corrosion-inhibiting compositions composed of an alkali metal molecularly dehydrated phosphate and an organic wetting agent in an aqueous medium to form a composition for treating metal surfaces to minimize corrosion thereof, said metal surfaces having thereon oil, grease, rust scale or the like. Other objects and advantages of the invention will appear hereinafter.

The treatment of Admiralty metal surfaces, iron surfaces, steel surfaces and the like in accordance with this invention is designed primarily for use in systems wherein cooling water is recirculated in the system. The primary application of the invention is in systems where water is employed as a coolant and at least the main body of the aqueous medium is recircuated in the system. Equipment to which the invention is applicable includes water-cooled condensers used in industrial processes such a oil refining and many other types of chemical processes, heat exchangers, and spray or cooling towers used to cool water used in industrial uses, viz., in the aforesaid condensers, in air-conditioning systems and the like. These aqueous medium range from waters of very low corrosive salt concentration in the order of 100 p.p.m. to systems wherein the salt concentrations range in the order of 2500 p.p.m. or even higher, the corrosive salts present being salts such as sodium chloride, sodium sulfate, sodium carbonate, calcium bicarbonate, calcium chloride, magnesium bicarbonate, magnesium chloride, etc.

The in-system treatment, wherein the protective film of molecularly dehydrated phosphate is laid on the metal surfaces of the assembled system without shut-down for treatment, is performed by pumping into the aqueous system sufficient molecularly dehydrated phosphate, with or without organic wetting agent, to bring the concentration of the molecularly dehydrated phosphate, expressed as PO$_4$, to a concentration of at least 60 p.p.m. The concentration of the molecularly dehydrated phosphate ordinarily should not exceed 250 p.p.m. in order to avoid other complications. For most applications, we have found a concentration in the order of 100–200 p.p.m., expressed as PO$_4$, will produce satisfactory results—concentrations in the order of 150 p.p.m. being most commonly employed.

The pH of the aqueous pretreatment should be slightly on the acid side. We recommend a pH in the range of 5.5–6.2, preferably about 5.9–6.2. At alkaline pH, e.g., greater than 7.5, the phosphate film will not adhere tightly to the metal and an inferior film results.

The treatment with the molecularly dehydrated phosphates at concentrations in the range of 60–250 p.p.m., expressed PO$_4$, is maintained in the in-system treatment for at least one day, ordinarily 3 to 4 days, and may extend as long as 15–20 days. The length of treatment largely depends upon the temperature of the phosphate containing treating liquid. Longer treatments are required when the treating liquid is circulated throughout the system at low temperatures than with systems wherein the treating liquid is maintained at higher temperatures. The treatment, can be successfully performed at temperatures between 60° F. and temperatures as high as about 200° F. with the understanding that treatments at low temperatures require longer contact periods between the metal surfaces and the treating liquid than is the case with the higher temperatures in order to lay down an effective phosphate film.

The soaking pretreatment, speaking again of the initial treatment of the metal surfaces with a molecularly dehydrated phosphate at relatively high concentration thereof, may be carried out at the same rate or much more rapidly than the in-system treatment. The soaking pretreatment applies to cases wherein the metal surfaces are treated with a molecularly dehydrated phosphate solution wherein the cooling system is allowed to be in contact with the pretreatment solution without flow or with mild agitation. It may take several forms. First, the system may be torn down, and the component parts allowed to soak in a vat or tank of the pretreatment liquid. This may be done at ambient temperature for one day to ten days. However, to reduce holding time of the metal parts in the vat or tank, it is recommended that the temperature of the vat treating liquid be in the order of 100–175° F. and the molecularly dehydrated phosphate be at a concentration in the range of 1,000–20,000 p.p.m. as PO$_4$ in order to accelerate the plating of the phosphate film on the metal surfaces. Organic wetting agents for scouring the metal surfaces of oil, grease, rust scale and the like may be used at concentrations in the order of 100–2000 p.p.m. if desired or necessary—depending upon the condition of the parts so treated. The treatment in the vat or tank at 100–175° F. will ordinarily only be a matter of hours. A treatment of two hours is sufficient in many cases and it is ordinarily unnecessary to extend treatment beyond 10 hours, 4–6 hours being adequate in most cases. Vat pretreatment at 100–1,000 p.p.m. PO$_4$ is also possible, but holding time becomes abnormally long as the concentration approaches 100 p.p.m.—requiring several days at 100 p.p.m. even with elevated temperature.

The soaking pretreatment may be done in other ways, also, under the general conditions outlined above with respect to the vat pretreatment. For example, the equipment containing the tubes to be treated need not be dismantled, but rather the soaking may be done by pumping the pretreatment fluid into the condenser, heat exchanger, etc., thereby soaking the tube surfaces. The heating of the pretreatment liquid may be done by heating the tubes being treated or by circulating the pretreatment fluid through a portable heater external of the equipment by means of a small pump in amounts sufficient to maintain the heat.

We have noted that very old equipment, which through long years of use has been pitted by corrosion and has rust, salt deposits and the like on the metal surfaces, can be cleaned by the soaking method without the use of a wetting agent—the treatment being solely that of treating the metal surfaces with concentrated solutions of the molecularly dehydrated phosphates. In this case the phosphates perform the dual function of scouring the metal surfaces of deposits thereon and also providing the protective, corrosion-inhibiting film on the scoured metal surfaces. In this case treatments at concentrations in the order of 500–20,000 p.p.m. of the molecularly dehydrated phosphate or mixtures thereof, expressed as PO$_4$, at a temperature in the range of 60–175° F. for a period of 4 hours to four days is recommended, the time of treatment varying inversely with the temperature and concentration as is true of the other pretreatments described previously.

The molecularly dehydrated phosphates which are preferred for use in accordance with our invention constitute those phosphates of a low order of molecular dehydration. The order of immediate effectiveness in forming corrosion-inhibiting films on metal surfaces appears from our studies to be related to the order of molecular dehydration. Tetrasodium pyrophosphate or disodium dihydrogen pyrophosphate, the first molecularly dehydrated phosphates in relative order of molecular dehydration with respect to the ortho phosphate, appear to have the most immediate effective action. The next molecularly dehydrated phosphate, sodium tripolyphosphate (Na$_5$P$_3$O$_{10}$), appears from our studies to be less active in the immediate formation of a protective corrosion-resistant film. This compound, however, has excellent corrosion-inhibiting properties with respect to metal surfaces treated therewith, although the effect appears more slowly. This is, perhaps, explained by the fact that rehydration of sodium tripolyphosphate in the aqueous treating medium passes through a first stage of rehydration wherein there is formed a mol of pyrophosphate and a mol of the ortho phosphate. The delayed protective action of the sodium tripolyphosphate is, thus, theorized as resulting from the rehydration of the tripolyphosphate into the pyrophosphate form— the latter being theorized as being the active corrosion-protecting agent. This theory is further supported by preliminary studies with sodium tetrapolyphosphate (Na$_6$P$_4$O$_{13}$), which exhibits corrosion-protecting properties, but at an immediate effective rate less than the tripolyphosphate. The rehydration of the tetrapolyphosphate, as theorized, passes through a first stage wherein the tripolyphosphate is formed along with the ortho phosphate followed by a second stage wherein the tripolyphosphate is hydrated to form the pyrophosphate and another mol of the ortho phosphate.

The rehydration of the tri- and tetrapolyphosphates is accelerated by increasing the temperature of the treating medium. Accordingly, these materials can be employed to provide a reserve of compounds which will eventually hydrate into the pyrophosphate form, thus providing a relatively constant supply of the more active pyrophosphate in the treating system.

The preferred treating liquids for both the pretreatment and the follow-up treatment, when phosphate is used in the follow-up treatment, will contain at least 50%, preferably at least 66%, of tetrasodiumpyrophosphate, disodium dihydrogen pyrophosphate, sodiumtripolyphosphate and/or sodiumtetrapolyphosphate, of the total weight of phosphates employed in the treating liquid. Other molecularly dehydrated phosphates, such as sodium septaphosphate, sodium decaphosphate (Na$_{12}$P$_{10}$O$_{31}$), sodium hexametaphosphate (Na$_6$P$_6$O$_{18}$) or other phosphate glasses composed of mixtures of molecularly dehydrated alkali metal phosphates of a relatively high order of molecular dehydration can be incorporated in minor amounts in the treating liquid, constituting not more than 50% and preferably constituting not more than 33% of the total weight of the phosphates in the treating liquid, but these latter molecularly dehydrated phosphates do not constitute preferred materials for the process of this invention.

Following the initial in-system pretreatment or the soaking pretreatment, the units such as condensers, heat exchangers, spray or cooling towers are continuously treated with a follow-up treatment of one of the types heretofore described. In the case of an all phosphate follow-up treatment, the system is maintained at a phosphate concentration, expressed as $PO_4$, in the order of 10-40 p.p.m. The phosphates used in this follow-up treatment are the preferred materials previously enumerated, tetrasodium pyrophosphate, sodium tripolyphosphate, and/or sodium tetrapolyphosphate. Molecularly dehydrated phosphates of a higher order of molecular dehydration, viz., sodium septaphosphate, sodium hexametaphosphate, sodium decaphosphate, and the phosphate glasses may be employed in amounts not exceeding one-half of the total phosphate concentration of the follow-up treatment. Once again, however, these latter materials do not constitute preferred compositons for the purpose of this invention.

If the follow-up treatment is a chromate type treatment, the treating liquid will contain an ionizable hexavalent chromium compound such as soduim chromate, potassium chromate, sodium dichromate dihydrate, potassium dichromate, and the like. The concentration of the chromate ion in the treating liquid of the follow-up treatment will preferably fall within the range of about 5-30 p.p.m. as $CrO_4$.

It has been found by others that the presence of other ions of inorganic compounds in the chromate treating liquid are advantageous in many instances. While such mixtures do not constitute a part of this invention per se the use of such mixtures in conjunction with the initial phosphate treatment with molecularly dehydrated phosphates is deemed to be within the contemplation of this invention. For example, chromate corrosion-inhibiting treatments have been found to be enhanced by the presence of a soluble hexavalent molybdenum or tungsten compounds and preferably also a compound capable of producing in aqueous solution ions of a heavy metal cation in a group consisting of zinc, cobalt, nickel, mercury and trivalent chromium. These heavy metals are usually employed with their water-soluble salts or bases. Zinc, nickel and cobalt ions have been found to be particularly effective. General formulations of such compounds include, on a weight basis of the compounds hereinafter enumerated, the ionizable hexavalent chromium compound, expressed as sodium dichromate dihydrate ($Na_2Cr_2O_7.2H_2O$), 50-98%; the ionizable hexavalent molybdenum or tungsten compound expressed as sodium molybdate dihydrate ($Na_2MoO_4.2H_2O$) and heavy metal ion, expressed as zinc sufate monohydrate ($ZnSO_4.H_2O$)

0-40%, preferably 3-40%.

The following is a specific example of such a formula:

COMPOSITION A

| Ingredients: | Percent by weight |
|---|---|
| Sodium dichromate ($Na_2Cr_2O_7.2H_2O$) | 66.0 |
| Sodium molybdate ($Na_2MoO_4$) | 5.3 |
| Glassy sodium polyphosphate (containing 35.9% $Na_2O$ and 64.1% $P_2O_5$ by weight) | 3.9 |
| Zinc sulfate ($ZnSO_4.H_2O$) | 18.5 |
| Sodium acid sulfate ($NaHSO_4$) | 5.2 |
| Water | 1.1 |

In the above specific formula the polyphosphate and the sodium acid sulfate are optional ingredients. The polyphosphate is added for the purpose of stabilizing calcium carbonate which may be present in the water to be treated. If calcium carbonate does not present a problem in the water to be treated the polyphosphate is omitted. However, since its presence does not adversely affect the use of the composition in any case, it is preferable to incorporate it into the corrosion-inhibiting composition in an amount such that the treated water will contain from 0.5 to 2 p.p.m. (parts per million), expressed as $PO_4$, of a polyphosphate and preferably about 1 p.p.m.

Other compositons of this type are typified by the following formulations:

COMPOSITION B

| Ingredients: | Percent by weight |
|---|---|
| Sodium dichromate dihydrate | 84.8 |
| Sodium polyphosphate shown in Composition A | 5.2 |
| Sodium molybdate dihydrate | 10.0 |

COMPOSITION C

| Ingredients: | |
|---|---|
| $Na_2Cr_2O_7.2H_2O$ | 58.5 |
| $Na_2MoO_4$ (anhydrous, technical grade) | 5.9 |
| Sodium polyphosphate of Composition A | 3.6 |
| $ZnSO_4.7H_2O$ | 27.0 |
| $NaHSO_4$ | 5.0 |

COMPOSITION D

| Ingredients: | |
|---|---|
| $K_2Cr_2O_7$ | 65.3 |
| $Na_2MoO_4$ (anhydrous, technical grade) | 6.7 |
| Sodium polyphosphate of Composition A | 4.0 |
| $ZnSO_4.H_2O$ | 19.0 |
| $NaHSO_4$ | 5.0 |

COMPOSITION E

| Ingredients: | |
|---|---|
| $Na_2Cr_2O_7.2H_2O$ | 8.5 |
| $Na_2CrO_4$ | 38.9 |
| $Na_2MoO_4$ (anhydrous, technical grade) | 4.7 |
| Sodium polyphosphate of Composition A | 2.8 |
| $ZnSO_4.7H_2O$ | 21.6 |
| $Na_2SO_4$ | 10.0 |
| $NaHSO_4$ | 13.5 |

COMPOSITION F

| Ingredients: | |
|---|---|
| $Na_2Cr_2O_7.2H_2O$ | 61.6 |
| $Na_2MoO_4$ (anhydrous, technical grade) | 6.2 |
| Sodium polyphosphate of Composition A | 3.8 |
| $ZnSO_4.7H_2O$ | 28.4 |

It will be recognized that the chromate agents are susceptible to some variation and modification in the manner of its practical application. It is generally desirable to employ the anionic ingredients of the corrosion-inhibiting composition in the form of their alkali metal salts, e.g., sodium and potassium. It will be understood, however, that such ingredients can be employed in the form of other water-soluble compounds. For example, the $CrO_4$ ion can be supplied as ammonium chromate or dichromate or chromic acid. The molybdenum and tungsten compounds can be supplied as their ammonium salts or as the acids.

Other compositions may be afforded by using the several heavy metal ions herein described in the form of cations of either the hexavalent chromium, molybdenum and tungsten compounds. Thus, zinc chromate, dichromate, molybdate and tungstate may be employed. In addition to the zinc salts such compounds as nickel molybdate, chromic molybdate, mercuric molybdate, nickel chromate, chronic tungstate, and nickel tungstate may be used. The necessary solubility can be achieved by proper pH control. The amount of heavy metal ion necessary to afford synergistic activity would, of course, remain within the ranges specified. By using these compounds the heavy metal salts may be omitted as a separate component of the several preferred formulations herein shown.

If a polyphosphate is employed as a part of the corrosion inhibiting composition or added separately to the liquid being treated in order to stabilize water against scale or incrustation, any of the ionizable water-soluble to difficultly soluble polyphosphate compounds can be used in accordance with the practice set forth in Fink and Richardson, U.S. 2,358,222 in amounts up to about 9 parts per million parts by weight of aqueous solution. This concentration may be exceeded wherein the phosphate is also used in conjunction with chromate for the former's corrosion-inhibiting properties. Examples of polyphosphates which are suitable for this purpose are any one or more of the following: disodium dihydrogen pyrophosphate, tetrasodium pyrophosphate, sodium tripolyphosphate ($Na_5P_3O_{10}$), sodium tetraphosphate ($Na_4P_6O_{13}$), calcium acid pyrophosphate, sodium trithiotetraphosphate ($Na_6P_4O_{10}S_3$), any of the water-soluble polyphosphate glasses or so-called molecularly dehydrated phosphates in which the ratio of $Na_2O$ to $P_2O_5$ may be variable, including those known as "sodium hexametaphosphate" and "glassy septaphosphate," as well as complexes containing calcium and sodium, magnesium and sodium and aluminum and sodium.

The initial high dosage pretreatment described heretofore is intended as being applicable to high initial dosages when a fresh system of aqueous medium is introduced into the system to be protected against corrosion. It is also applicable to systems which are already in operation and in which corrosion is proceeding at a relatively rapid rate and is not in check by the corrosion-inhibiting medium employed in the system. Accordingly, the initial pretreatment is also intended to cover slug treatment of a system already in operation—the slug treatment being a build-up of the molecularly dehydrated phosphate content of the operating system to a range in the order of 60–250 p.p.m. under the conditions heretofore described.

The discovery of an organic wetting agent for use in the system concurrently with the molecularly dehydrated phosphate treatment for the purpose of scouring metal surfaces of grease, oil, rust and the like was complicated by the fact that many wetting agents of the detergent type function effectively only on the alkaline side, whereas the phosphate treatment is carried out on the acid side within the pH range of about 5.5–6.2, preferably 5.9–6.2. Furthermore, a satisfactory wetting agent having the required detergent action on a slightly acid side of neutral should be formulated easily with the phosphate.

While this invention contemplates the separate additions of the organic wetting agent and the molecularly dehydrated phosphates in treating systems, wherein formulation of the two into a single product is not a problem, this aspect of the invention in its preferred form relates to formulations in the solid or paste state of low water content wherein the molecularly dehydrated phosphates and the organic wetting agents are formulated as mixtures into a single compound—simplifying the control of the relative amounts of the two ingredients added to the treating system. From both a formulation viewpoint and a detergent activity viewpoint, two detergents of the non-ionic type were determined to be outstanding. These detergents are both oxyethylated organic compounds containing about 6–12 oxyethylene groups per mol of organic nucleus. One detergent, hereinafter designated Wetting Agent A, is an octyl phenol (para and/or ortho) oxyethylated with 7–8 mols of ethylene oxide per mol of phenol. A similar compound useful in the invention is octyl phenol oxyethylated with 10 mols of ethylene oxide per mol of phenol. The phenol alkyl group may be other than octyl and may be any alkyl group containing 5–12 carbons. The other class of detergent particularly useful in this invention is an oxyethylated aliphatic monohydric alcohol. The alcohol has 8–18 carbons, and contains 6–15 mols of ethylene oxide per mol of alcohol. One embodiment eminently useful in the invention herein disclosed is dodecyl alcohol oxyethylated with nine mols of ethylene oxide per mol of alcohol, hereinafter designated Wetting Agent B.

However, other materials which function in systems of the type herein described, though not necessarily easily susceptible to formulation with the molecularly dehydrated phosphates into a single formulation of two compounds, but which were observed to provide satisfactory grease removal and not interfere with the corrosion-inhibition of the phosphate corrosion inhibitors or the formation of at least relatively good films, include the following surface-active agents: a coconut oil fatty acid ester of sodium isoethionate, a polyoxyethylene ether of hydroabietic alcohol, sodium N-methyl, N-oleoyl taurate, sodium N-methyl, N-palmityl taurate, sodium alkyl amide sulfonate, sodium dodecylbenzene sulfonate, lauric isopropanol amide, hydrogenated tallow alcohol ethoxylated with 6–12 mols of ethylene oxide per mol of alcohol. These wetting agents were found to be effective in concentrations in the order of 100–250 p.p.m. with in-system pretreatments at $PO_4$ concentrations in the range of 100–400 p.p.m. In soaking pretreatment, 100–2000 p.p.m. of active detergent is recommended. The concentration is dependent on the condition of the tubes, the treating time and treating temperature.

Corrosion Inhibition Evaluations

For corrosion-inhibiting tests on a laboratory basis, a multiple purpose corrosion testing unit was used to run tests on a laboratory scale. The vessel in which the tests were conducted consisted of a Pyrex jar 6 inches in diameter and 8 inches in height. An overflow tube projected from the side of the jar 2 inches from the top. When filled to the overflow tube the vessel contains 2.5 liters.

The lid for the jar consisted of two stainless steel semicircular plates bolted together and having a common center. Six test specimens were suspended from this lid by glass hooks so that their upper edges were held 2 inches below the surface of the water in the test container, and oriented parallel with the wall of the test vessel about 0.75 inch from it.

Through one of the holes in the lid was admitted a Pyrex tube with a 10 mm. medium porosity fritted disk to aerate the liquid in the test container. The water was fed through a glass tube entering another hole in the lid. The tube extended to a point 2 inches from the bottom of the test container.

Through a hole in the center of the lid passed a stainless steel paddle agitator. The paddle was 4 inches below the surface of the water. The agitator turned at a rate of 176 r.p.m.

Seven of these test containers were set in a constant temperature oil bath. The liquid level in each container was about 2 inches above the bath level. For the tests reported, the temperature was maintained at the value designated.

Two five gallon reservoirs feeding one test container were connected to a common header which had lines running to a drain and also to a float valve. Immediately below the float valve assembly was a solenoid valve which was activated by a recycling timer every 18 minutes, permitting 40 ml. of treated water from the reservoirs to flow into the test container. The holding time index was 13 hours. The holding time index is the time required to reduce the concentration of the treatment to one-half if the replenishment supply contains no treatment.

The corrosion test specimens consisted of one sandblasted 1010 mild steel probe and five standard sandblasted 1010 mild steel coupons 1 x 2 inches. A 3/16 inch hole was drilled 1/4 inch from the shorter edge. The probe was a strip of metal of 4 mils thickness of either steel or Admiralty metal. The ends were connected with a Wheatstone bridge, and the resistance to electrical conductance in the probe was measured during the test. The corrosion of the probe during the tests was calculated from the measurements of increasing resistance due to decreasing cross-section of the probe resulting from corrosion of the metal.

The specimens were uniformly sandblasted, rinsed with acetone and toluene, then weighed and immersed in the bath. Upon removal from the bath, the corrosion product was removed by a 30 sec. immersion in muriatic acid inhibited with formaldehyde. The specimen was then immersed in a saturated sodium carbonate solution. The specimen was then rinsed in distilled water and dried by dipping in acetone, then in toluene.

A synthetic cooling tower water was prepared. First, a 60 gallon vat of Chicago tap water was acidified with sulfuric acid to a pH between 5.6 and 5.8, and then aerated. Various salts were then added to give the approximate concentrations shown below.

Total hardness as $CaCO_3$----------------p.p.m.-- 400
Calcium hardness as $CaCO_3$-------------p.p.m.-- 250
Magnesium hardness as $CaCO_3$----------p.p.m.-- 150
Total (MO) Alk. as $CaCO_3$--------------p.p.m.-- 4
Chloride as NaCl--------------------------p.p.m.-- 500
Sulfate as $Na_2SO_4$----------------------p.p.m.-- 1400
pH-------------------------------------- 5.6 to 5.8

This water was then pumped into the 5 gallon reservoirs and the treatment added. The pH was then adjusted to 6–6.5. In tests run at higher pH, adjustment was made by the addition of a 10% solution of sodium carbonate. The treated water was then fed into the test containers by gravity, the rate being controlled in the manner described above.

A 24-hour conditioning period preceded the test run. During this period the system was operated in the normal manner but with the absence of the specimens. At the end of this period the specimens were placed in the test vessel. The test was continued for the indicated period. The specimens were evaluated at the end of the test visually and by weight loss, and the deposit on the specimen was analyzed in some cases.

During the tests, the water in the test containers was analyzed periodically for pH, $PO_4$ and chloride. Neither dilution nor accumulation of the treatment or dissolved solids occurred. Tests were also conducted with tubing instead of steel specimens in the test vessels described, supra, in accordance with the technique described, supra. The tests were run as follows:

*Vat pretreatment tests.*—The specimens were 3 in. lengths of ½ in. O.D., 16 gauge mild steel seamless tubing. The grease on the tubes as received from the supplier was left on the outside, but the inside was degreased with toluene. The ends were stoppered, and the tubes were suspended by a Nichrome wire wrapped around the stopper in 500 ml. of the desired pretreatment in a 600 ml. beaker. After the cleaning period, the tube was removed, dried and evaluated for grease removal and film formation. The tube was then placed in a test vessel in the testing unit, treated with the follow-up treatment designated. After this second test period, the specimens were removed and observed for local attack. From this data, the efficiency of the pretreatment could be determined.

*In-system pretreatment tests.*—The specimens used were the same as for the vat tests above. The stoppered specimens were suspended in a test vessel in the testing unit containing the desired pretreatment in Chicago tap water (pH 6.0–6.5). After the pretreatment period, the solution flowing from the reservoir was changed from the pretreatment liquid to the follow-up treatment designated, the water being the standard cooling tower test water. After 24 hours the specimens were evaluated visually for grease removal, film formation, and avoidance of local corrosion. With the chromate follow-up treatment, tuberculation developed within a few hours in the absence of the pretreatment.

*Heat transfer tests.*—These tests were designed as a modification of the foregoing tests, to have a heat transfer surface which would act as a specimen for evaluation of corrosion and fouling. The test unit has a reservoir, feed system, and test vessel identical to those of the testing unit, supra, except that no oil bath is used. Solution is pumped from the vessel by means of a stainless steel pump; then vertically through the annular space between a 17 in. long, ½ in. O.D., 16 gauge tube, and an outer glass jacket 16″ in length. A ⅜ in. O.D. by 16 in. 500 watt heater is inserted inside of the tube. This tube acts as the test specimen, and was either a mild steel seamless tube, or an Admiralty tube.

After flowing contact with the tube, the solution flows downward through a glass condenser, with cooling water in the jacket and back into the reservoir. The cooling water flow to the jacket is controlled by means of a thermostat in the test vessel, so that the vessel may be maintained at any desired temperature, in these tests, either 95°, 125° or 160° F.

The pretreatment tests in the heat transfer unit were run as follows:

*Vat treatment tests.*—The tube was cleaned with toluene on the inside, but the grease was left on the outside as received from the supplier. The ends of the tube were stoppered, and the tube placed in a two-liter graduate filled with the desired pretreatment solution, at the desired test temperature. At the end of the test period, the tube was dried, and weight No. 1 taken. The tube was then placed in the heat transfer apparatus, and the test run using the indicated treatment in the standard cooling tower water. During this final phase of testing, the temperature was always 125° F., and the flow as 1.1 ft./sec. equivalent (fast flow). At the end of the test period, the tube was dried, and weight No. 2 taken. After cleaning, weight No. 3 was taken. The difference between weights 3 and 2 gave the weight of the scale+corrosion product+film formed during the pretreatment. The difference between weights 3 and 1 gave the weight of the metal lost by corrosion during the heat transfer test+the film formed during the vat pretreatment step, reported as corrosion+film.

*In-system tests.*—The tubing, with the grease left on the outside, was placed in the heat transfer apparatus. The test was started using the desired pretreatment solution in Chicago tap water; the pH of the solution was maintained between 6.0 and 6.2. After the end of the pretreatment period, the test solution coming from the reservoir was changed to the indicated follow-up treatment in the standard cooling tower water, at the indicated temperature and at the indicated velocity regardless of the condition maintained during the pretreatment step.

The specimen could not be weighed originally, because the amount of grease was variable, so the corrosion was evaluated visually, and also by analysis of the deposit on the tubing for iron. The iron analysis of the deposit on the tube was used because there had been observed a correlation between this analysis and corrosion. Weights at the end of the test and after cleaning determined the scale+corrosion product+film formed during the pretreatment step.

In these, and all other tests where grease removal was observed, the amount of grease on the tube could be estimated by examination with ultra-violet light. In addition, on many of the tests, the deposit on the tube was analyzed for the total hardness, iron, and ortho phosphate. Also, the tubes were examined visually for fouling or tuberculation.

The following compositions constitute specific examples of dry and paste phosphate formulations which have been used to formulate the phosphate treatment in the pretreatment and/or follow-up treatment. The formulations containing wetting agents are used only in the pretreatment with molecularly dehydrated phosphate. The wetting agent constitutes about 2% to 200% by weight of the total molecularly dehydrated phosphate. Best results have been observed in grease removal during phosphate pretreatment with formulations having at least 50% by weight of wetting agent in reference to total molecularly dehydrated phosphate weight.

COMPOSITION G

| | Percent by weight |
|---|---|
| Tetrasodium pyrophosphate, anhyd | 25 |
| Sodium tripolyphosphate | 75 |

COMPOSITION H

| | |
|---|---|
| Tetrasodium pyrophosphate, anhyd | 50 |
| Sodium septaphosphate | 50 |

COMPOSITION I

| | |
|---|---|
| Tetrasodium pyrophosphate, anhyd | 97.2 |
| Dodecyl alcohol oxyethylated with 9 mols of ethylene oxide/mol alcohol | 2.8 |

COMPOSITION J

| | |
|---|---|
| Sodium tripolyphosphate | 72.2 |
| Sodium ferrocyanide | 27.8 |

COMPOSITION K

| | |
|---|---|
| Tetrasodium pyrophosphate, anhyd | 33.3 |
| Sodium septaphosphate | 33.3 |
| Sodium ferrocyanide | 33.3 |

COMPOSITION L

| | |
|---|---|
| Tetrasodium pyrophosphate | 18.8 |
| Disodium dihydrogenphosphate | 78.0 |
| Dodecyl alcohol oxyethylated with 9 mols of ethylene oxide/mol alcohol | 3.2 |

COMPOSITION M

[Paste formulations]

| | Percent by weight |
|---|---|
| Tetrasodium pyrophosphate, anhyd. | 9.8 |
| Sodium tripolyphosphate | 29.2 |
| Sodium ferrocyanide | 1.5 |
| Santosite | 1.2 |
| Octyl phenol oxyethylated with 7–8 mols ethylene oxide | 29.2 |
| Silicone antifoam | 0.2 |
| Ethylene glycol | 12.2 |
| Water | 16.7 |

COMPOSITION N

| | Percent |
|---|---|
| Tetrasodium pyrophosphate | 36 |
| Sodium tripolyphosphate | 50 |
| Sodium carbonate | 14 |

Corrosion tests were run on steel panels in the previously described multiple purpose corrosion testing unit by employing an 8-day $PO_4$ pretreatment at a concentration of 60 p.p.m. $PO_4$ with Composition K, described heretofore. Thereafter the treatment was reduced to 10 p.p.m. $PO_4$ of the molecularly dehydrated phosphate treatments indicated. The results are reported in Table I below. Sodium ferrocyanide is used as a corrosion inhibitor synergist.

TABLE I

Corrosion Results on Steel Panels with 10 p.p.m. $PO_4$ Treatment After Eight-Day 60 p.p.m. $PO_4$ Pretreatment

| Treatment | Days elapsed in treatment period | Total corrosion (cumulative), microinches |
|---|---|---|
| I. 10 p.p.m. phosphate, as $PO_4$, 5 p.p.m. sodium ferrocyanide.[1] | 8 | 1.5 |
| | 10 | 2.1 |
| | 12 | 2.1 |
| | 14 | 5.0 |
| | 16 | 7.8 |
| | 20 | 13.5 |
| | 22 | 17.5 |
| | 23 | 21.2 |
| | 26 | 26.1 |
| II. 10 p.p.m. sodium tripolyphosphate, as $PO_4$, 5 p.p.m. sodium ferrocyanide. | 8 | 1.0 |
| | 10 | 1.0 |
| | 12 | 2.0 |
| | 14 | 4.1 |
| | 16 | 6.2 |
| | 20 | 11.2 |
| | 22 | 13.6 |
| | 23 | 15.5 |
| | 26 | 18.7 |

[1] 50% by weight tetrasodium pyrophosphate, 50% by weight sodium septaphosphate.

The results of the foregoing tests indicate that if a protective molecularly dehydrated phosphate film is formed with an initial high dosage in the pretreating liquid, the treatment can thereafter be lowered to levels which themselves would have provided no initial corrosion protection. This indicates that once initial phosphate film is formed by high dosage treatment, the protective film can be maintained at relatively low dosages.

The results reported in Table II were determined in the multiple purpose corrosion testing unit with decreasing amounts of $PO_4$ content in a sodium septaphosphate-tetrasodium pyrophosphate treatment initially containing approximately equal parts by weight of the septaphosphate and pyrophosphate. In this test the $PO_4$ content was decreased in increments to ascertain the effect on total corrosion and corrosion rate of the steel panels. These tests also show the beneficial effect of an initial treatment at a relatively high dosage in conjunction with a follow-up treatment at lower dosages. It is interesting to note that the total corrosion and corrosion rate at the 10 p.p.m. $PO_4$ follow-up treatment were held down to what is considered minimum values.

TABLE II

Corrosion Results on Steel Specimens With Decreasing Amounts of $PO_4$ in a Sodium Septaphosphate-Tetrasodium Pyrophosphate Treatment at Equal Parts by Weight of Phosphates

| Hours elapsed in treatment period | Total $PO_4$ p.p.m. | Total corrosion, microinches | Corrosion rate between successive readings, mils/yr. |
|---|---|---|---|
| 0 [1] | 60 | 46 | |
| 16 | 60 | 52 | 2.6 |
| 42 [2] | 60 | 56 | 1.7 |
| 72 | 40 | 62 | 1.8 |
| 95 | 40 | 64 | 1.0 |
| 167 [3] | 40 | 72 | 1.0 |
| 192 | 20 | 78 | 1.8 |
| 216 | 20 | 80 | 0.9 |
| 258 | 20 | 82 | 0.3 |
| 432 [4] | 20 | 98 | 0.8 |
| 496 | 10 | 102 | 0.5 |
| 520 | 10 | 104 | 0.4 |
| 547 | 10 | 106 | 0.6 |
| 592 | 10 | 110 | 0.8 |
| 616 | 10 | 112 | 0.9 |
| 642 | 10 | 114 | 0.8 |
| 664 [5] | 10 | 115 | 0.2 |
| 604 | | 118 | 1.1 |
| 712 | | 122 | 2.2 |
| 736 | | 172 | 1.71 |

[1] 60 p.p.m. treatment began.  [2] 40 p.p.m. treatment began.  [3] 20 p.p.m. treatment began.  [4] 10 p.p.m. treatment began.  [5] Treatment discontinued.

Tests on the multiple purpose corrosion testing unit were also conducted with steel specimens wherein an initial pretreatment of 65 p.p.m. $PO_4$ of Composition N, supra, was conducted for two days followed by a 15 p.p.m. $CrO_4$ treatment with Composition A, supra, later increased to 30 p.p.m. The specimens treated with 15 p.p.m. $CrO_4$, without the initial phosphate pretreatment, showed a pronounced local type of attack. Tests increasing the chromate content up to 100 p.p.m. were conducted without the phosphate pretreatment, but even at 100 p.p.m. there were many small points of local attack both at pH 5.5 and pH 7.5. The local attack was eliminated, however, with the initial treatment of 65 p.p.m. $PO_4$ of Composition N for two days, followed by 15 p.p.m. $CrO_4$ treatment with Composition A. The results of the tests which are reported below in Table III, indicated that 15 p.p.m. $CrO_4$ did not give sufficient corrosion inhibition, but when increased to 30 p.p.m., reduced the rate to less than 1 MPY. It is believed from subsequent data that a 20 p.p.m. treatment would have given satisfactory corrosion protection. No local attack was found in the specimen. These tests indicate that where local attack is a problem, initial pretreatment with a relatively high dosage on the order of 60–250 p.p.m. $PO_4$ and intermittent slug treatment at the same high phosphate levels should eliminate the local attack problem.

In-System Pretreatment

Results of in-system treatment tests are reported in Tables IV, V and VI. The purpose of the in-system pretreatment, which is conducted at relatively high dosages of $PO_4$ with molecularly dehydrated phosphates, is to degrease and form a protective film on the metal surfaces of pipes and the like in cooling systems, condensers, heat exchangers, etc. The pretreatment is designed to be used at reasonable dosages, function in a short time, and be compatible with the regular system treatment. To form a base for comparison, tests were conducted on steel tubes in the previously described heat transfer apparatus wherein pretreatment with molecularly dehydrated phosphates were omitted. The results of these tests are reported in Table IV. With both a chromate and a phosphate treatment these tests were conducted at a tube temperature of 125° F.

TABLE IV

*Results of In-System Treatment Tests Without Pretreatment With Heat Transfer Apparatus*

| Type of tube | Condition of tube | Treatment | Concentration as $PO_4$ or $CrO_4$, p.p.m. | Time, days | Tuberculation | Deposit analysis, mg. | | | | Weight loss data, mg. | |
|---|---|---|---|---|---|---|---|---|---|---|---|
| | | | | | | $PO_4$ | Fe | Total hardness | $CrO_4$ | Scale plus corrosion prod. plus film | Corrosion plus film |
| Steel | Not cleaned | Chromate (comp. A). | 20, $CrO_4$ | 1 | Mod | | | | | 82 | |
| | Not cleaned | | 20, $CrO_4$ | 2 | Mod | | | | | 138 | |
| | Not cleaned | | 20, $CrO_4$ | 14 | V. heavy | 59 | 240 | 80 | 0 | 913 | |
| | Toluene cleaned | | 20, $CrO_4$ | 14 | V. heavy | 46 | 340 | 28 | | 864 | 484 |
| | Not cleaned | Comp. A (30 p.p.m.) plus $Na_2CrO_4$. (10 p.p.m.). | 40, $CrO_4$ | 14 | Heavy | 69 | 690 | 83 | 0 | 2,219 | |
| | Toluene cleaned | | 40, $CrO_4$ | 14 | Heavy | 54 | 155 | Tr. | 0 | 503 | 229 |
| | Not cleaned | | 40, $CrO_4$ | 14 | Heavy | | 1,100 | 68 | | 2,689 | |
| Steel | Not cleaned | Phosphate (comp. J). | 30, $PO_4$ | 7 | Heavy | 250 | 850 | 190 | | 2,232 | |
| | Toluene cleaned | | 30, $PO_4$ | 7 | Heavy | 290 | 1,800 | 140 | | 3,867 | 3,032 |
| | Not cleaned | | 40, $PO_4$ | 7 | Heavy | 380 | 450 | 225 | | 1,696 | |
| | Toluene cleaned | | 40, $PO_4$ | 7 | Heavy | 34 | 280 | 140 | | 1,066 | 465 |
| Admiralty metal | | Phosphate (Comp. D). | 30, $PO_4$ | 7 | None | 33 | | 30 | 43 | 143 | 564 |
| | | Chromate (Comp. A). | 20, $CrO_4$ | 7 | None | | | 16 | 26 | 42 | 42 |

TABLE III

*Corrosion Results on Steel Specimens With Varied Amounts of Composition A Follow-Up Treatment After 65 p.p.m. Phosphate Pretreatment With Composition N for Two Days*

| Hours elapsed in treatment period | Total $CrO_4$, p.p.m. | Total corrosion, microinches | Corrosion rate, mils./yr. |
|---|---|---|---|
| 0–2 | $PO_4$ pretreatment period | | |
| 2 | 15 | 10 | 0.5 |
| 3 | 15 | 14 | |
| 5 | 15 | 35 | |
| 6 | 15 | 46 | |
| 10 | 15 | 95 | 4.2 |
| 12 | 15 | 120 | |
| 14 [1] | 15 | 140 | |
| 15 | 30 | 145 | 2.4 |
| 17 | 30 | 160 | 1.6 |
| 20 | 30 | 168 | 1.3 |
| 22 | 30 | 175 | 0.8 |
| 26 [2] | 15 | 212 | 4.8 |
| 28 | 15 | 232 | 5.3 |
| 30 | 15 | 265 | 8.7 |
| 32 | 15 | 330 | 11.4 |
| 34 | 15 | 374 | 8.5 |

[1] Began 30 p.p.m. $CrO_4$ treatment.
[2] Began 15 p.p.m. $CrO_4$ treatment at 23 days.

Table V constitutes the results obtained in an in-system pretreatment in the heat transfer apparatus with a composition of the following formula:

| | Percent |
|---|---|
| Tetrasodium pyrophosphate, anhyd | 9.8 |
| Sodium tripolyphosphate | 29.2 |
| Sodium ferrocyanide | 1.5 |
| Sodium sulfite | 1.2 |
| Octyl-phenol oxyethylated with 7–8 mols of ethylene oxide per mol of phenol | 29.2 |
| Silicone antifoam | 0.2 |
| Ethylene glycol | 12.2 |
| Water | 16.7 |

The pretreatment was followed up by either a chromate or a phosphate follow-up treatment at concentrations in the order of 20–30 p.p.m. $PO_4$ or $CrO_4$. In the case of chromate follow-up treatment the primary aim of the pretreatment was to reduce the tendency toward the heavy tuberculation noted in Table IV where the chromate treatment without the molecularly dehydrated phosphate pretreatment was used.

The local attack on steel tubes in chromate treatment shows up in a growth of corrosion product about local areas of corrosion. The corrosion product forms small mounds on the metal surface about the corrosion pit in the metal. These mounds are called "tubercules," and the formation of such tubercules is called "tuberculation."

TABLE V

Results of In-System Pretreatment Tests With Heat Transfer Apparatus

| Type of tube | Condition of tube | Pretreatment | | | | Follow-up treatment | | | Fouling | Grease removed | Tuber- culation | Deposit analysis, mg. | | | Weight loss, scale plus cor- rosion product plus film, mg. |
|---|---|---|---|---|---|---|---|---|---|---|---|---|---|---|---|
| | | PO₄, p.p.m. | Temp., °F. | Flow rate | Time, days | Treating agent | CrO₄ or PO₄, p.p.m. | Time, days | | | | PO₄ | Fe | Total hard- ness | |
| Steel | 20% tuber- cules. | 150 | 125 | Slow | 5 | Chromate (comp. A) | 30 | 4 | None | Good | Mod | | | | |
| | Not cleaned | 150 | 95 | Fast | 4 | Chromate (comp. A) | 20 | 14 | None | Good | Slight | 70 | 88 | 48 | 297 |
| | Not cleaned | 100 | 125 | Fast | 3 | Chromate (comp. A) | 20 | 3 | Slight | Good | Heavy | 170 | 110 | 94 | 435 |
| | Not cleaned | 150 | 125 | Fast | 4 | Chromate (comp. A) | 20 | 2 | Slight | Fair | Heavy | | | | 659 |
| | Not cleaned | 150 | 125 | Fast | 4 | Phosphate (comp. j) | 30 | 7 | None | Fair | None | 240 | 150 | 90 | 592 |
| | Not cleaned | 150 | 95 | Fast | 4 | Phosphate (comp. j) | 30 | 3 | None | Fair | None | 114 | 105 | 45 | 449 |
| Admiralty metal. | Not cleaned | 150 | 125 | Fast | 14 | Chromate (comp. A) | 20 | 7 | None | | None | | | | 73 |
| | Not cleaned | 150 | 95 | Fast | 4 | Chromate (comp. A) | 20 | 7 | None | | None | 8 | 14 | 19 | 69 |

It was found beneficial to keep the pH of in-system phosphate pretreatment test in the range of 5.9 to 6.2. A pH above 7.5 is dangerous because of potential fouling, especially when the temperature is relatively high.

As stated heretofore, the discovery of a wetting agent which functions well in the degreasing of tubes at the pH of the pretreatment, which is in the order of 5.9–6.2, has been a somewhat difficult problem. For the most part, wetting agents having a detergent action toward grease in aqueous systems, function best on the alkaline side of neutral. In general, tests with pretreatments containing both wetting agent and phosphate at a pH of 9, to accomplish degreasing, followed by switching to a pH in the order of 6, wherein the phosphate film formation can be carried out more effectively, creates fouling difficulties due to deposition of the phosphate on the metal surfaces. Therefore, it is preferred to have a wetting agent which would function at a pH in the range of about 5.9–6.2. Several wetting agents were found which degrease while in this pH range, the concentration of the wetting agent in the pretreatment liquid being in the order of 100 to 400 p.p.m. Wetting agents which function well in the pretreatment of steel tubes at a pH of 6.0 are listed in the following table, wherein the data summarizes the conditions under which the tests were carried out and the results thereof.

roded and discolored admiralty metal. To overcome this difficulty with admiralty metal pretreatments, sodium mercaptobenzothiazole was added to the molecularly dehydrated phosphate pretreatment in amounts in the range of 2–15 p.p.m., preferably 6–8 p.p.m. At 6 p.p.m. sodium mercaptobenzothiazole in the in-system phosphate pretreatment, a reduction of corrosion of admiralty metal over pretreatment without sodium mercaptobenzothiazole of about 90% was noted. Reduction of corrosion of admiralty metal during follow-up treatment with molecularly hydrated phosphates, following a pretreatment containing sodium mercaptobenzothiazole, were also noted. However, chromate follow-up treatments are preferred for admiralty metal over phosphate without mercaptobenzothiazole follow-up treatments. Sodium mercaptobenzothiazole may be used also in pretreatments on steel tubes, but the benefits from use thereof are not as pronounced as with admiralty metal pretreatment. Follow-up phosphate treatments on admiralty metal are improved by 1–6, preferably 2–4, p.p.m. sodium mercaptobenzothiazole.

The data in the following table summarizes test conditions and results obtained with heat transfer apparatus described supra, wherein pretreatment and/or follow-up treatment of both steel and admiralty metal tubes was conducted by a pretreatment at a tube temperature of 95°

TABLE VI

Results of In-System Pretreatment Tests on Steel Tubes With Composition N Plus Wetting Agents at Initial pH of 6.0

| Pretreatment | | | | | | | Follow-up treatment | | Fouling | Grease removed | Tubercu- lation | Weight loss, scale plus corrosion product plus film, mg. |
|---|---|---|---|---|---|---|---|---|---|---|---|---|
| PO₄, p.p.m. | Wetting agent No. | Conc. active wetting agent, p.p.m. | Conc. so- dium fer- rocyanide, p.p.m. | Temp., °F. | Flow rate | Time, days | Comp. A, p.p.m. CrO4 | Time, days | | | | |
| 100 | 1 | 200 | 15 | 125 | Fast | 3 | 20 | 10 | None | V. good | None | 196 |
| 100 | 1 | 200 | 15 | 125 | Slow | 3 | 20 | 3 | Mod | Good | None | 482 |
| 250 | 1 | 250 | 15 | 125 | Slow | 3 | 20 | 3 | Slight | Good | None | 453 |
| 200 | 2 | 200 | 15 | 125 | Slow | 1 | | | Heavy | Poor | | |
| 200 | 3 | 200 | 15 | 125 | Slow | 1 | | | Mod | Fair | | |
| 150 | 4 | 150 | 15 | 125 | Slow | 3 | | | None | Good | None | |
| 100 | 4 | 200 | 8 | 125 | Slow | 3 | 20 | 3 | None | Good | None | 272 |
| 150 | 5 | 150 | 8 | 125 | Slow | 1 | | | None | Good | None | 97 |
| 150 | 2 | 150 | 8 | 125 | Slow | 3 | 20 | 3 | None | Good | None | 398 |
| 100 | 2 | 200 | 8 | 125 | Slow | 3 | 20 | 3 | None | Good | None | 230 |
| 150 | 4 | 150 | 8 | 125 | Slow | 3 | | | None | Good | None | 362 |

NOTE.—No. 1—Octyl phenol oxyethylated with 7–8 mols of ethylene oxide/mol phenol. No. 2—Coconut oil fatty acid ester of sodium isethionate. No. 3—Alkyl amide sulfonate. No. 4—Palmitoyl methyl tauride. No. 5—Oleoyl methyl tauride.

Based on the tests summarized in Tables I through VI, it will be seen that the phosphate pretreatment in accordance with the instant invention is most effective in reducing corrosion of steel tubes. In general, the phosphate in-system pretreatments heretofore described slightly corroded F., a 1 ft./sec. equivalent flow rate, and a pH of 6.0–6.3 with molecularly dehydrated phosphates at a concentration of 150 p.p.m. as PO₄ and a sodium mercaptobenzothiazole (Na MBT) concentration of 6 p.p.m. for the period indicated. The molecularly dehydrated phosphate composition added in the pretreatment was of the following formulation:

| | Percent by weight |
|---|---|
| Tetrasodiumpyrophosphate, anhyd | 10.2 |
| Tripolyphosphate | 30.4 |
| Wetting agent A | 43.2 |
| Sodium mercaptobenzothiazole (50% active) | 2.4 |
| Silicone antifoam | 0.2 |
| Ethylene glycol | 4.7 |
| Water | 8.9 | tively high concentration of the molecularly dehydrated phosphates, the concentration generally being in the order of 1,000 to 20,000 p.p.m. $PO_4$. The concentration of the wetting agent for removing the grease which may be present on the exchanger bundles is in the order of 100–500 p.p.m. The pH of the vat liquid is in the range of 5.9–6.2 as is the case in the in-system treatment in order to obtain most effective results. The wetting agents listed in Table VI may be used in the vat pretreatment, wetting agent A and wetting agent B being considered the most

TABLE VII

*In-System and Follow-Up Pretreatment Tests in Presence of Sodium Mercaptobenzothiazole*

| Type tube | Pretreatment | | Follow-up treatment | | | Fouling | Discoloration of tube | Grease removal | Tuberculation | Scale plus corrosion product plus film, mg. | Corrosion, mg. |
|---|---|---|---|---|---|---|---|---|---|---|---|
| | Time, days | NaMBT conc., p.p.m. | Comp. J, p.p.m. $PO_4$ | Comp. A, p.p.m. $CrO_4$ | Time, days | | | | | | |
| Steel | 3 | 6 | None | None | None | None | | V. good | None | 89 | |
| Steel | 3 | 6 | 30 | | 7 | None | | V. good | None | 89 | |
| Steel | 4 | 6 | | 20 | 13 | None | | V. good | Slight | 170 | |
| Steel | 3 | 6 | | 20 | 14 | Slight | | V. good | Slight | 275 | |
| Admiralty | 4 | 6 | None | None | None | | None | | | 14 | 11 |
| Admiralty | 4 | 6 | 30 | | 28 | | Slight | | | 21 | 21 |
| Admiralty | 3 | 6 | | 20 | 7 | | None | | | 15 | 11 |
| Admiralty | None | None | ¹ 30 | | 7 | | Brown | | | 38 | 25 |
| Admiralty | None | None | ² 30 | | 7 | | None | | | 18 | 14 |
| Pretreatment without NaMBT | | | | | | | | | | | |
| Steel | 4 | 0 | 30 | | 7 | None | | V. good | None | 449 | |
| Steel | 3 | 0 | | 20 | 14 | None | | V. good | Slight | 210 | |
| Admiralty | 4 | 0 | None | None | None | | Brown | | | 16 | 117 |
| Admiralty | 4 | 0 | None | None | None | | Brown | | | 29 | 126 |

¹ Plus 1 p.p.m. NaMBT.   ² Plus 2 p.p.m. NaMBT.

The use of sodium mercaptobenzothiazole in soaking pretreatments of admiralty metal, particularly in pretreatments at elevated temperatures for up to 10 hours, is not necessary inasmuch as admiralty metal does not corrode or discolor to any appreciable degree during the short soaking treatment. However, where soaking is carried out for a long period, e.g., one or more days, the use of sodium mercaptobenzothiazole may prove to be of beneficial effect as it is in the in-system pretreatment and phosphate follow-up treatments reported in the above table.

Vat Pretreatment

In the vat type of pretreatment, exchanger bundles, condenser parts, water cooling system parts, and the like are dipped in a vat of heated solution containing a relatively effective and economical. The $PO_4$ concentration should be in the order of 0.5% (5,000 p.p.m.) or above with a minimum dosage of 200 p.p.m. of wetting agent B, for example. In general, the holding time in the vat is in the order of 1–10 hours with 4 hours being ample in most cases.

The tests in the following table were conducted with tetrasodium pyrophosphate or a mixture of tetrasodium-pyrophosphate and disodium dihydrogen pyrophosphate and wetting agents A or B as the grease detergent under various conditions of pretreatment.

In some instances the tubes treated by the vat pretreatment process were given a follow-up treatment with a chromate treating agent. The results of these tests are reported in the table below.

TABLE VIII

*Preliminary Vat Pretreatment Tests*

| Vat pretreatment—Experimental conditions | | | | | | | Observations | | | |
|---|---|---|---|---|---|---|---|---|---|---|
| Total $PO_4$ (percent) | $Na_4P_2O_7$ (p.p.m. as $PO_4$) | $Na_2H_2P_2O_7$ (p.p.m. as $PO_4$) | Wetting agent B (p.p.m.) | Wetting agent A (p.p.m.) | pH | Temp. (° F.) | Grease removal | | Fouling | Film formation |
| | | | | | | | 1 hr. | 4 hrs. | | |
| 0.5 | 5,000 | | | 200 | 6 | 140 | Good | V. good | None | V. good. |
| 1 | 10,000 | | | 200 | 6 | 140 | Fair | Good | None | V. good. |
| 2 | 20,000 | | | 200 | 6 | 140 | V. poor | Fair | None | Good. |
| 2 | 20,000 | | | 400 | 6 | 140 | Good | Good | None | V. good. |
| 1 | 10,000 | | 200 | | 6 | 140 | Good | V. good | None | V. good. |
| 2 | 20,000 | | 200 | | 6 | 140 | Fair | Good | None | V. good. |
| 1 | 10,000 | | 100 | | 9 | 140 | V. good | V. good | None | None. |
| 1 | 10,000 | | 200 | | 9 | 140 | V. good | V. good | None | None. |
| 1 | 10,000 | | 400 | | 9 | 140 | V. good | V. good | None | None. |
| 2 | 20,000 | | 100 | | 9 | 140 | V. good | V. good | None | None. |
| 2 | 20,000 | | 200 | | 9 | 140 | V. good | V. good | None | None. |
| 2 | 20,000 | | 400 | | 9 | 140 | V. good | V. good | None | None. |
| 2 | 20,000 | | 140 | | 9 | 140 | V. good | V. good | None | None. |
| 0.2 | 500 | 1,500 | | 400 | 6.5 | 140 | Good | V. good | None | Good. |
| 0.2 | 1,000 | 1,000 | | 400 | 7.5 | 140 | Good | V. good | None | Good. |
| 0.25 | 1,600 | 800 | | 400 | 8.5 | 140 | Good | V. good | None | Fair. |
| 0.5 | 1,250 | 3,750 | | 400 | 6.5 | 140 | Good | V. good | None | Good. |
| 0.5 | 2,500 | 2,500 | | 400 | 7.5 | 140 | Good | V. good | None | Good. |
| 0.5 | 3,640 | 1,560 | | 400 | 8.5 | 140 | Good | V. good | None | Fair. |
| 0.2 | 500 | 1,500 | 400 | | 6.7 | 140 | Good | V. good | None | V. good. |
| 0.2 | 1,000 | 1,000 | 400 | | 7.6 | 140 | Good | V. good | None | Good. |
| 0.25 | 1,600 | 800 | 400 | | 8.5 | 140 | Good | V. good | None | Fair. |
| 0.5 | 1,250 | 3,750 | 400 | | 6.5 | 140 | Good | V. good | None | V. good. |
| 0.5 | 2,800 | 2,500 | 400 | | 7.5 | 140 | Good | V. good | None | Good. |
| 0.5 | 3,640 | 1,560 | 400 | | 8.6 | 140 | Good | V. good | None | Fair. |
| 0.2 | 300 | 1,700 | | 400 | 6.0 | 140 | Good | V. good | None | Good. |
| 0.5 | 450 | 4,450 | | 400 | 5.8 | 140 | Good | V. good | None | Good. |
| 0.2 | 300 | 1,700 | 400 | | 6.1 | 140 | Good | V. good | None | Good. |
| 0.5 | 450 | 4,450 | 400 | | 5.8 | 140 | Good | V. good | None | V. good. |

Similar treatments were conducted with steel and admiralty metal tubes at various concentrations of Composition L, supra, in the vat pretreatment. The follow-up treatment in this series of tests was either phosphate or chromate. The conditions of the tests and the results therefrom are recorded in the following table.

treatments were too low to effectively protect against corrosion in the absence of the pretreatment step. Protection in test (a) could be maintained only by slugging approximately every ten days with 40 p.p.m. of Composition J as $PO_4$, and as a result the test was discontinued as being unsatisfactory. However, in test (b) and (c)

TABLE IX

*Vat Pretreatment Results in Heat Transfer Test*

| Vat pretreatment | | | | Follow-up treatment | | | Observations | | | Weight loss data | |
|---|---|---|---|---|---|---|---|---|---|---|---|
| Conc., percent total solids content | pH | Temp, °F. | Time, hrs. | Comp. J, p.p.m. $PL_4$ | Comp. A, p.p.m. $CrO_4$ | Time, days | Film | Tuber | Grease removal | Scale plus film plus corr. prd., mg. | Film plus corrosion, mg. |
| No pretreatment (steel) | | | | | | | | | | | |
|  |  |  |  |  | 20 | 1 | None | Mod | None | 189 |  |
|  |  |  |  |  | 20 | 1 | None | Mod | V. good | 91 | 52 |
| Pretreatment—Composition I (steel) | | | | | | | | | | | |
| 2.0 | 9 | 140 | 4 | 20 |  | 1 | None | None | V. good | 399 | 269 |
| 2.0 | 9 | 140 | 4 | 30 |  | 7 | None | None | V. good | 347 | 212 |
| 2.0 | 9 | 140 | 4 | 40 |  | 13 | None | None | V. good |  | 347 |
| 2.0 | 9 | 140 | 2 | 60 |  | 4 | None | None | V. good | 271 | 206 |
| 2.0 | 9 | 160 | 2 |  | 20 | 1 | None | Mod | V. good | 74 | 65 |
| Pretreatment—Composition L (steel) | | | | | | | | | | | |
| 1.25 | 6 | 140 | 4 | None | None |  | Good | None | Good | 125 | 60 |
| 1.25 | 6 | 140 | 4 | None | None |  | Good | None | V. good | 110 | 59 |
| 1.25 | 6 | 140 | 4 | 20 |  | 1 | Good | None | V. good | 270 | 264 |
| 1.25 | 6 | 140 | 4 | 30 |  | 1 | Good | None | V. good | 171 | 176 |
| 1.25 | 6 | 140 | 4 | 60 |  | 1 | Good | None | V. good | 142 | 163 |
| 1.25 | 6 | 140 | 4 | 60 |  | 3 | Good | None | V. good | 209 | 222 |
| 1.25 | 6 | 140 | 2 | 30 |  | 3 | Good | None | V. good | 190 | 189 |
| 1.25 | 6 | 140 | 4 |  | 30 | 1 | Good | None | V. good | 170 | 162 |
| 1.25 | 6 | 180 | 4 |  | 20 | 1 | Good | None | V. good | 188 | 196 |
| 1.25 | 6 | 140 | 4 |  | 20 | 6 | Good | None | V. good | 222 |  |
| 1.25 | 6 | 140 | 5 |  | 20 | 14 | Good | None | V. good | 196 | 188 |
| 1.25 | 6 | 180 | 4 |  | 20 | 14 | Good | None | V. good | 207 | 193 |
| Blank (admiralty metal) | | | | | | | | | | | |
| None | None | None | None |  | 20 | 7 |  | None |  | 42 | 43 |
| 1.25 | 6 | 140 | 4 |  |  |  | Fair | None | V. good |  | 18 |
| None | None | None | None | 30 |  | 7 | Fair | None | V. good | 143 | 564 |
| Pretreatment—Composition L (admiralty metal) | | | | | | | | | | | |
| 1.25 | 6 | 140 | 4 | 30 |  | 7 | Fair | None | V. good | 255 | 138 |
| 1.25 | 6 | 140 | 4 |  | 20 | 7 | Fair | None | V. good | 29 | 49 |
| 1.25 | 6 | 140 | 4 |  | 20 | 13 | Fair | None | V. good | 167 | 127 |

It is noted from the foregoing results that a pH of 9 is satisfactory in the vat pretreatment when phosphate is employed as the follow-up treatment. Accordingly, the pH in the vat pretreatment may be on the alkaline side in this instance. However, a pretreatment at a pH of 9 accompanied by a follow-up treatment with chromate did not give satisfactory results as will be noted in Table VIII, supra. In this instance tuberculation was noted on the tubes. The vat pretreatment at a pH of 9 with a follow-up chromate treatment did not improve the tuberculation noted in tests run without pretreatment. However, pretreatments at a pH of about 6 gave good results with both chromate and phosphate follow-up. Good results are obtained with the tetrasodium pyrophosphate, disodium dihydrogen phosphate pretreatment in the presence of wetting agent A as the wetting agent at pH 6 and concentrations in the order of 1.0% $PO_4$ (10,000 p.p.m. $PO_4$) with either chromate of phosphate as the final treatment. No tuberculation was observed in any test. Grease removal was very good. Accordingly, this vat pretreatment may be considered as being very successful in degreasing and in laying down a protective film which is resistant to future tuberculation.

In addition to the foregoing tests, additional tests were carried out on a long term basis with a phosphate pretreatment. These tests established the advantages of phosphate film formation by the high concentration pretreatment.

Using the multiple purpose corrosion testing unit previously described, three tests were started by pretreating at a concentration of 60 p.p.m. as $PO_4$ for four days with Composition J, supra, which contains 66.7% sodium tripolyphosphate and 33.3% sodium ferrocyanide. After the four-day pretreatment, the treatment was changed to (a) Composition J at a concentration of 10 p.p.m. $PO_4$, (b) Composition J at a concentration of 20 p.p.m. $PO_4$ and (c) Composition A at a concentration of 15 p.p.m. $CrO_4$. In all cases the dosages in the follow-up corrosion and scaling protection were still being maintained after 4½ months of the follow-up treatment. In test (b), after 141 days, the total scale was 369 milligrams, the total corrosion on the coupon was 116 milligrams and the corrosion rate was 0.6 mil per year. In test (c), after 50 days, the total scale on the tube was 33 milligrams and the total corrosion products on the tube was 23 milligrams with a corrosion rate of 0.3 mil per year. Our determinations indicate that there was a constant rate of corrosion over the last four months of the period and in both tests the corrosion rate was appreciably less than 1 mil per year.

Therefore, it will be seen from the foregoing description of the invention that the pretreatment of metal surfaces, particularly steel and admiralty metal, in contact with corrosive aqueous media by molecularly dehydrated phosphates, particularly tetrasodiumpyrophosphate, disodium dihydrogen pyrophoshate, sodiumtripolyphosphate, sodiumtetrapolyphosphate, and admixtures thereof, as well as mixtures with molecularly dehydrated phosphates at a higher order of molecular dehydration, substantially improves corrosion protection by the formation of a protective film during the pretreatment step. This protective film can then be maintained by a follow-up treatment with phosphate, chromate, phosphate-chromate mixtures, or organic corrosion inhibitors so that the corrosion of the metal surfaces in contact with the aqueous corrosive media is maintained within tolerable limits. In general, the pretreatment, either in-system or vat, is improved by the incorporation into the pretreatment liquid of a wetting agent which has a detergent action toward grease whereby the grease is removed from the metal surfaces to facilitate the laying down of a tight, initial phosphate film. The treatments herein described can be carried out by pH control without fouling of the tubes by formation of insoluble precipitates originating in the treating medium, such as calcium or magnesium sulfates, carbonates and/or phosphates. The beneficial reduction of loss of metal by corrosion and the maintenance of heat transfer rates across the tubes by reduction of corrosion products and/or tuberculation on tube surfaces constitues an important economic aspect of this invention. Other advantages of the invention have been outlined heretofore.

Where the word "rehydration" is used herein it is meant to mean the commonly understood phenomenon of the reversion of molecularly dehydrated phosphates to lower forms thereof.

The word "compound" as used herein is meant to includes mixtures and blends of two or more chemical compounds as well as distinct chemical compositions such as pure compounds, inorganic crystals, glasses and the like.

The invention is hereby claimed as follows:

1. A process for inhibiting corrosion of a surface of a metal selected from the group consisting of ferrous metals and admiralty metals in contact with water containing corrosive salts which comprises contacting said surface for a period of at least one day with water at a pH of 5.5 to 7.5, containing at least one molecularly dehydrated phosphate at a concentration of 60–250 p.p.m., expressed as $PO_4$, to form a protective phosphate coating on said surface, and thereafter maintaining said protective coating on said metal surface during contact with water containing corrosive salts by maintaining in said water a corrosion inhibiting compound selected from the group consisting of a water-soluble, molecularly dehydrated phosphate salt, a water-soluble chromate salt, and a water-soluble dichromate salt at a concentration of 10–40 p.p.m. of said phosphate salt, expressed as $PO_4$, and 5–30 p.p.m. of said chromate and dichromate salts, expressed as $CrO_4$.

2. A process for inhibiting corrosion of a surface of a metal selected from the group consisting of ferrous metals and admiralty metals in contact with water containing corrosive salts which comprises contacting said surface for a period of at least one day with water at a pH of 5.5 to 7.5, containing at least one molecularly dehydrated phosphate at a concentration of 60–250 p.p.m., expressed as $PO_4$, to form a protective phosphate coating on said surface, and thereafter maintaining said protective coating on said metal surface during contact with water containing corrosive salts by maintaining in said water a water-soluble, molecularly dehydrated phosphate salt at a concentration of 10–40 p.p.m., expressed as $PO_4$.

3. A process for inhibiting corrosion of a surface of a metal selected from the group consisting of ferrous metals and admiralty metals in contact with water containing corrosive salts which comprises contacting said surface for a period of at least one day with water at a pH of 5.5 to 7.5, containing at least one molecularly dehydrated phosphate at a concentration of 60–250 p.p.m., expressed as $PO_4$, to form a protective phosphate coating on said surface, and thereafter maintaining said protective coating on said metal surface during contact with water containing corrosive salts by maintaining in said water a water-soluble chromate salt at a concentration of 5–30 p.p.m., expressed as $CrO_4$.

4. A process for inhibiting corrosion of a surface of a metal selected from the group consisting of ferrous metals and admiralty metals in contact with water containing corrosive salts which comprises contacting said surface for a period of at least one day with water at a pH of 5.5 to 7.5, containing at least one molecularly dehydrated phosphate at a concentration of 60–250 p.p.m., expressed as $PO_4$, to form a protective phosphate coating on said surface, and thereafter maintaining said protective coating on said metal surface during contact with water containing corrosive salts by maintaining in said water a water-soluble dichromate salt at a concentration of 5–30 p.p.m., expressed as $CrO_4$.

5. A process for inhibiting ferrous metal corrosion in systems wherein cooling water containing corrosive salts is in contact with ferrous metal tube surfaces which comprises contacting said tube surfaces for a period of at least one day with an aqueous treating liquid, having a pH of 5.5 to 6.2 and containing at least one molecularly dehydrated phosphate at a concentration of 60–250 p.p.m., expressed as $PO_4$, to form protective phosphate coatings on said tube surfaces, and thereafter maintaining said protective coating on said tube surfaces during contact with water containing corrosive salts by maintaining in said water a water-soluble, molecularly dehydrated phosphate salt at a concentration of 10–40 p.p.m., expressed as $PO_4$.

6. A process for inhibiting ferrous metal corrosion in systems wherein cooling water containing corrosive salts is in contact with ferrous metal tube surfaces which comprises contacting said tube surfaces for a period of at least one day with an aqueous treating liquid, having a pH of 5.5 to 6.2 and containing at least one molecularly dehydrated phosphate at a concentration of 60–250 p.p.m., expressed as $PO_4$, to form protective phosphate coatings on said tube surfaces, and thereafter maintaining said protective coating on said tube surfaces during contact with water containing corrosive salts by maintaining in said water a chromate salt at a concentration of 5–30 p.p.m., expressed as $CrO_4$.

7. A process for inhibiting ferrous metal corrosion in systems wherein cooling water containing corrosive salts is in contact with ferrous metal tube surfaces which comprises contacting said tube surfaces for a period of at least one day with an aqueous treating liquid, having a pH of 5.5 to 6.2 and containing at least one molecularly dehydrated phosphate at a concentration of 60–250 p.p.m., expressed as $PO_4$, to form protective phosphate coatings on said tube surfaces, and thereafter maintaining said protective coating on said tube surfaces during contact with water containing corrosive salts by maintaining in said water a water-soluble dichromate salt at a concentration of 5–30 p.p.m., expressed as $CrO_4$.

8. In a process for reducing the corrosion of ferrous metal tubes a cooling system in contact with cooling water containing corrosive salts wherein the cooling water contains a corrosion inhibiting chemical selected from the group consisting of water-soluble, molecularly dehydrated phosphates, water-soluble chromate salts, and water-soluble dichromate salts at a treating dosage of 10–40 p.p.m. of said phosphates and 5–30 p.p.m. of said chromates and dichromates, the improvement which comprises slugging into said cooling water system at intermittent periods at a pH of 5.5–7.5 a water-soluble molecularly dehydrated phosphate selected from the group consisting of tetrasodium pyrophosphate, disodium dihydrogen phosphate, sodium tripolyphosphate, and mixtures thereof in an amount sufficient to provide a concentration of molecularly dehydrated phosphate in said cooling water of 60–250 p.p.m., expressed as $PO_4$, contacting said tube surfaces for at least one day with said molecularly dehydrated phosphate solution, and maintaining the phosphate coating between said intermittent sluggings of said molecularly dehydrated phosphate by maintaining a concentration of said corrosion inhibiting chemical in said cooling water at the aforesaid treating dosage for said corrosion inhibiting chemical.

9. A process for inhibiting admiralty metal corrosion in systems wherein cooling water containing corrosive salts is in contact with admiralty metal tube surfaces which comprises contacting said tube surfaces for a period of at least one day with an aqueous treating liquid, having a pH of 5.5 to 6.2 and containing at least one molecularly dehydrated phosphate at a concentration of 60–250 p.p.m., expressed as $PO_4$, to form protective phosphate coatings on said tube surfaces, and thereafter maintaining said protective coating on said tube surfaces during contact with water containing corrosive salts by maintaing in said water a water-soluble, molecularly dehydrated phosphate salt at a concentration of 10–40 p.p.m., expressed as $PO_4$.

10. A process for inhibiting admiralty metal corrosion in systems wherein cooling water containing corrosive salts is in contact with admiralty metal tube surfaces which comprises contacting said tube surfaces for a period of at least one day with an aqueous treating liquid, having a pH of 5.5 to 6.2 and containing at least one molecularly dehydrated phosphate at a concentration of 60–250 p.p.m., expressed as $PO_4$, to form protective phosphate coatings on said tube surfaces, and thereafter maintaining said protective coating on said tube surfaces during contact with water containing corrosive salts by maintaining in said water a water-soluble chromate salt at a concentration of 5–30 p.p.m., expressed as $CrO_4$.

11. A process for inhibiting admiralty metal corrosion in systems wherein cooling water containing corrosive salts is in contact with admiralty metal tube surfaces which comprises contacting said tube surfaces for a period of at least one day with an aqueous treating liquid, having a pH of 5.5 to 6.2 and containing at least one molecularly dehydrated phosphate at a concentration of 60–250 p.p.m., expressed as $PO_4$, to form protective phosphate coatings on said tube surfaces, and thereafter maintaining said protective coating on said tube surfaces during contact with water containing corrosive salts by maintaining in said water a water-soluble, dichromate salt at a concentration of 5–30 p.p.m., expressed as $CrO_4$.

12. In a process for reducing the corrosion on ferrous metal tubes in contact with water containing corrosive inorganic salts in cooling systems wherein corrosive activity on said metal tubes by said corrosive salts is present, the improvement which comprises treating the tube surfaces normally in contact with said corrosive inorganic salts with an aqueous treating liquid at a pH of 5.5–7.5 and containing 60–20,000 p.p.m., expressed as $PO_4$, of at least one molecularly dehydrated phosphate plus a small amount of sodium ferrocyanide as a corrosion-inhibiting synergist for the molecularly dehydrated phosphate for a sufficient time to form a protective phosphate coating on said tube surfaces, the weight ratio of said sodium ferrocyanide to said molecularly dehydrated phosphate falling in the range of 1.5:39 to 1:3, and thereafter maintaining said protective coating on said metal surface during contact with water containing corrosive salts by maintaining in said water a corrosion inhibiting compound selected from the group consisting of a water-soluble, molecularly dehydrated phosphate salt, a water-soluble chromate salt, and a water-soluble dichromate salt at a concentration of 10–40 p.p.m. of said phosphate salt, expressed as $PO_4$, and 5–30 p.p.m. of said chromate and dichromate salts, expressed as $CrO_4$.

13. A process for inhibiting corrosion of a surface of a metal selected from the group consisting of ferrous metals and admiralty metals in contact with water containing corrosive salts which comprises (a) contacting said surface for a period of 1–10 hours with water having a pH of 5.5–7.5 and a temperature of 100–175° F., said water containing at least one molecularly dehydrated phosphate at a molecularly dehydrated phosphate concentration of 1,000–20,000 p.p.m., expressed as $PO_4$, to form a protective phosphate coating on said surface and (b) thereafter maintaining said protective coating on said metal surface during contact with water containing corrosive salts by maintaining in said water a corrosion inhibiting compound selected from the group consisting of a water-soluble, molecularly dehydrated phosphate salt, a water-soluble chromate salt, and a water-soluble dichromate salt at a concentration of 10–40 p.p.m. of said phosphate salt, expressed as $PO_4$, and 5–30 p.p.m. of said chromate and dichromate salts, expressed as $CrO_4$.

References Cited in the file of this patent

UNITED STATES PATENTS

| | | |
|---|---|---|
| 2,194,491 | Bird et al. | Mar. 26, 1940 |
| 2,238,651 | Keenen | Apr. 15, 1941 |
| 2,337,856 | Rice et al. | Dec. 28, 1943 |
| 2,582,129 | Jacoby | Jan. 8, 1952 |
| 2,711,391 | Kahler | June 21, 1955 |
| 2,793,932 | Kahler et al. | May 28, 1957 |
| 2,796,370 | Ostrander et al. | June 18, 1957 |
| 2,809,906 | Baecker et al. | Oct. 15, 1957 |
| 2,874,081 | Cavanagh et al. | Feb. 17, 1959 |

FOREIGN PATENTS

| | | |
|---|---|---|
| 625,065 | Great Britain | June 21, 1949 |
| 552,694 | Canada | Feb. 4, 1958 |

UNITED STATES PATENT OFFICE
CERTIFICATE OF CORRECTION

Patent No. 3,081,146                         March 12, 1963

David B. Boies et al.

It is hereby certified that error appears in the above numbered patent requiring correction and that the said Letters Patent should read as corrected below.

Column 6, line 65, for "chronic" read -- chromic --; column 19, TABLE IX, under the heading "Follow-up treatment", fifth column, line 3 thereof, for "$PL_4$" read -- $PO_4$ --.

Signed and sealed this 17th day of December 1963.

(SEAL)
Attest:

ERNEST W. SWIDER
Attesting Officer

EDWIN L. REYNOLDS

Acting Commissioner of Patents